United States Patent
Yoshida et al.

(10) Patent No.: US 10,870,586 B2
(45) Date of Patent: Dec. 22, 2020

(54) CALCIUM CARBONATE AND PRODUCTION METHOD THEREFOR

(71) Applicant: SHIRAISHI KOGYO KAISHA, LTD., Osaka (JP)

(72) Inventors: Maya Yoshida, Amagasaki (JP); Kenichiro Eguchi, Amagasaki (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/489,112

(22) PCT Filed: Feb. 23, 2018

(86) PCT No.: PCT/JP2018/006673
§ 371 (c)(1),
(2) Date: Aug. 27, 2019

(87) PCT Pub. No.: WO2018/159484
PCT Pub. Date: Sep. 7, 2018

(65) Prior Publication Data
US 2020/0062608 A1    Feb. 27, 2020

(30) Foreign Application Priority Data
Feb. 28, 2017    (JP) .................... 2017-036651

(51) Int. Cl.
*C01F 11/18*    (2006.01)
*C08K 3/26*    (2006.01)
*B01J 35/02*    (2006.01)
*B01J 35/06*    (2006.01)
*B01J 35/10*    (2006.01)

(52) U.S. Cl.
CPC .......... *C01F 11/181* (2013.01); *C01F 11/185* (2013.01)

(58) Field of Classification Search
None
See application file for complete search history.

(56) References Cited

U.S. PATENT DOCUMENTS 5,750,086 A * 5/1998 You ..................... B82Y 30/00
423/432

FOREIGN PATENT DOCUMENTS

| JP | 47-22944 B1 | 6/1972 |
| JP | 60-90819 A | 5/1985 |
| JP | 60-90822 A | 5/1985 |

(Continued)

OTHER PUBLICATIONS

Notification of Transmittal of Translation of the International Preliminary Report on Patentability (Form PCT/IB/338) issued in counterpart International application No. PCT/JP2018/006673 dated Sep. 12, 2019 with Forms PCT/IB/373 and PCT/ISA/237. (8 pages).

(Continued)

*Primary Examiner* — Daniel Berns
(74) *Attorney, Agent, or Firm* — Westerman, Hattori, Daniels & Adrian, LLP (57) ABSTRACT

Provided are a calcium carbonate having a small particle diameter and easily dispersible in polymers and a production method therefor. A calcium carbonate has a magnesium content of 12000 to 120000 ppm, a BET specific surface area of 60 to 120 m²/g, and a crystallite size of (104) plane of 20 to 50 nm, and particles of the calcium carbonate are concatenated.

8 Claims, 2 Drawing Sheets

(56) References Cited

FOREIGN PATENT DOCUMENTS

JP      62-17020 A    1/1987
JP      2009-155120 A  7/2009

OTHER PUBLICATIONS

International Search Report dated Apr. 24, 2018, issued in counterpart International Application No. PCT/JP2018/006673 (1 page).

* cited by examiner

CALCIUM CARBONATE AND PRODUCTION METHOD THEREFOR

TECHNICAL FIELD

The present invention relates to calcium carbonates and production methods for the same.

BACKGROUND ART

Calcium carbonates are widely used in applications including sealants, rubbers, and plastics, and particularly, fine calcium carbonates are used as inorganic fillers for the purpose of improving physical properties in the above applications. From the viewpoint of reinforcing a polymer, theoretically, the smaller the particle diameter of calcium carbonate, the more its effect of reinforcing the polymer can be increased. However, in fact, if the particle diameter of calcium carbonate is small, its particles agglomerate together to form agglomerates, so that they are difficult to disperse in the polymer. Therefore, it is known that if the particle diameter is too small, a high reinforcing effect cannot be achieved.

Patent Literature 1 reports that when, in blowing carbon dioxide gas into a calcium hydroxide slurry to carbonate the calcium hydroxide slurry, a water-soluble magnesium salt is added to the slurry in the course of carbonation reaction, a particle-concatenated fine calcium carbonate can be obtained. Meanwhile, HAKUENKA O (manufactured by Shiraishi Kogyo Kaisha, Ltd.) is known as a commercialized product of calcium carbonate of smallest particle diameter for incorporation into rubbers.

CITATION LIST

Patent Literature

Patent Literature 1: Examined Japanese Patent Application Publication No. S47-22944

SUMMARY OF INVENTION

Technical Problem

The particle-concatenated calcium carbonate disclosed in Patent Literature 1 does not exhibit a reinforcing effect surpassing that of HAKUENKA O which is a commercialized product of calcium carbonate. Therefore, there have been demands for calcium carbonates exhibiting a reinforcing effect surpassing that of HAKUENKA O. To this end, it is necessary to develop calcium carbonates having a small particle diameter and easily dispersible in polymers.

An object of the present invention is to provide a calcium carbonate having a small particle diameter and easily dispersible in polymers and a production method therefor.

Solution to Problem

A calcium carbonate according to the present invention has a magnesium content of 12000 to 120000 ppm, a BET specific surface area of 60 to 120 $m^2/g$, and a crystallite size of (104) plane of 20 to 50 nm, particles of the calcium carbonate being concatenated.

The calcium carbonate according to the present invention preferably has an X-ray diffraction pattern free of peak attributable to any magnesium compound.

The calcium carbonate according to the present invention preferably has a calcite crystal structure.

The calcium carbonate according to the present invention may be surface-treated with at least one treatment agent selected from the group consisting of a fatty acid, a resin acid, derivatives of the acids, silica, a coupling agent, an organosilicon compound, and a condensed phosphoric acid.

A production method according to the present invention includes the steps of: preparing a water dispersion of calcium hydroxide to which magnesium hydroxide is added; and introducing carbon dioxide gas into the water dispersion to produce a calcium carbonate. The amount of magnesium hydroxide added relative to the amount of calcium hydroxide is preferably 15000 to 160000 ppm.

A polymer composition according to the present invention contains the above-described calcium carbonate according to the present invention.

A calcium carbonate according to the present invention is produced by the above-described production method according to the present invention.

Advantageous Effects of Invention

The present invention enables provision of a calcium carbonate having a small particle diameter and easily dispersible in polymers.

DESCRIPTION OF EMBODIMENTS

Hereinafter, a description will be given of a preferred embodiment. However, the following embodiment is merely illustrative and the present invention is not limited to the following embodiment.

<Calcium Carbonate>

(Magnesium Content)

A calcium carbonate according to the present invention has a magnesium content of 12000 to 120000 ppm (mg/kg). When the magnesium content is in the above range, crystal growth of calcium carbonate in a heating process after a carbonation reaction can be suppressed, so that a fine calcium carbonate can be provided.

The magnesium content is preferably in a range of 15000 to 100000 ppm and more preferably 20000 to 90000 ppm.

The magnesium content (ppm) is the amount (mg) of magnesium in terms of metallic elements relative to the amount (kg) of the calcium carbonate. The magnesium content can be measured, for example, with an ICP emission spectrometer.

(BET Specific Surface Area)

The calcium carbonate according to the present invention has a BET specific surface area of 60 to 120 $m^2/g$. The BET specific surface area is preferably 60 to 110 $m^2/g$, more preferably 70 to 100 $m^2/g$, and still more preferably 80 to 100 $m^2/g$.

The BET specific surface area can be measured with a fully automatic specific surface area measurement device or so on.

(Crystallite Size of (104) Plane)

The calcium carbonate according to the present invention has a crystallite size of (104) plane of 20 to 50 nm. The crystallite size of (104) plane is preferably 20 to 45 nm, more preferably 20 to 40 nm, and still more preferably 20 to 30 nm.

The crystallite size of (104) plane can be calculated from the integral of a peak attributable to (104) plane in an X-ray diffraction pattern using the Scherrer equation.

(Shape of Calcium Carbonate)

In the calcium carbonate according to the present invention, the particles are concatenated. It can be considered that since the calcium carbonate has such a particle-concatenated shape, the calcium carbonate can stably exist without strongly agglomerating, even though it has a large BET specific surface area and a small particle diameter. Furthermore, since the particles are concatenated and have a BET specific surface area and a crystallite size of (104) plane in the above respective ranges, a calcium carbonate easily dispersible in polymers can be provided.

The shape of the calcium carbonate can be observed with a transmission electron microscope, a scanning electron microscope or the like.

(Characteristics in X-Ray Diffraction Pattern)

The calcium carbonate according to the present invention preferably has an X-ray diffraction pattern free of peak attributable to any magnesium compound. Examples of the magnesium compound showing no peak include magnesium hydroxide, basic magnesium carbonate, and normal magnesium carbonate. The terms "free of peak" and "showing no peak" mean that the peak intensity is $\frac{1}{100}$ or less of the peak intensity of the peak of calcium carbonate in (104) plane.

The calcium carbonate according to the present invention preferably has a calcite crystal structure.

<Surface Treatment>

The calcium carbonate according to the present invention may be surface-treated. For example, the calcium carbonate may be surface-treated with at least one treatment agent selected from the group consisting of a fatty acid, a resin acid, derivatives of the acids, silica, a coupling agent, an organosilicon compound, and a condensed phosphoric acid.

The amount of surface treatment is appropriately controlled depending on the type of surface treatment agent used, the particle diameter of the calcium carbonate, the purpose for surface treatment, and so on. The amount of surface treatment is, for example, relative to 100 parts by mass of the calcium carbonate, preferably in a range of 0.2 to 20 parts by mass and more preferably in a range of 0.5 to 10 parts by mass.

As for the surface-treated calcium carbonate, the calcium carbonate before being surface-treated may have a BET specific surface area in the range defined in the present invention or the calcium carbonate after being surface-treated may have a BET specific surface area in the range defined in the present invention.

(Fatty Acid, Resin Acid, and Derivatives Thereof)

No particular limitation is placed on the type of fatty acid and derivative thereof. Examples of the fatty acid and derivatives thereof include fatty acids, metal salts thereof, and esters thereof.

Examples of fatty acids include saturated and unsaturated fatty acids having 6 to 31 carbon atoms.

Specific examples of the saturated fatty acids include caproic acid, caprylic acid, pelargonic acid, capric acid, undecanoic acid, lauric acid, myristic acid, palmitic acid, stearic acid, araic acid, behenic acid, lignoceric acid, cerotic acid, montanoic acid, and melissic acid. Preferably used among them are lauric acid, myristic acid, palmitic acid, stearic acid, and oleic acid.

Specific examples of the unsaturated fatty acids include obtusilic acid, calroleic acid, undecylenic acid, linderic acid, tsuzuic acid, physeteric acid, myristoleic acid, palmitoleic acid, petroselinic acid, oleic acid, elaidic acid, asclepic acid, vaccenic acid, gadoleic acid, gondoic acid, cetoleic acid, erucic acid, brassidic acid, selacholeic acid, ximenic acid, lumequeic acid, sorbic acid, and linoleic acid.

Examples of metal salts of fatty acids include sodium salts, potassium salts, and other alkali metal salts of the above fatty acids, and magnesium salts, calcium salts, and other alkaline earth metal salts of the above fatty acids. Preferred among them are sodium salts, potassium salts and other alkali metal salts of the above fatty acids.

Examples of esters of fatty acids include stearyl stearate, lauryl stearate, stearyl palmitate, and lauryl palmitate.

More preferred examples of the fatty acid and derivatives thereof include sodium salts and potassium salts of saturated fatty acids having 9 to 21 carbon atoms. Particularly preferred among them are sodium salts of lauric acid, myristic acid, palmitic acid, stearic acid, and oleic acid.

No particular limitation is placed on the type of resin acid and derivative thereof. Examples of the resin acid and derivatives thereof include resin acids, metal salts thereof, and other derivatives thereof.

Specific examples of the resin acids include abietic acid, pimaric acid, levopimaric acid, neoabietic acid, palustric acid, dehydroabietic acid, dihydroabietic acid, tetraabietic acid, dextropimaric acid, and isodextropimaric acid.

Examples of metal salts of resin acids include sodium salts, potassium salts, and other alkali metal salts of the above resin acids, and magnesium salts, calcium salts, and other alkaline earth metal salts of the above resin acids.

Examples of derivatives of resin acids also include hydrogenated rosin, disproportionated rosin, polymerized rosin, rosin esters, maleated rosin, maleated rosin esters, and rosin-modified phenol.

Preferred examples of the resin acid and derivatives thereof include abietic acid, neoabietic acid, dehydroabietic acid, tetraabietic acid, pimaric acid, dextropimaric acid, hydrogenated rosin, disproportionated rosin, and maleated rosin.

No particular limitation is placed on the method for surface treating the calcium carbonate with at least one of a fatty acid, a resin acid, and derivatives of the acids.

As the surface treatment, for example, a method may be employed of adding, to a slurry containing the calcium carbonate and water, at least one of a fatty acid, a resin acid, and derivatives of the acids and then dehydrating and drying the slurry. An example of a specific method for surface-treating the calcium carbonate with an alkali metal salt of a fatty acid is the following method.

A fatty acid is heated in an aqueous alkali metal solution, such as an aqueous sodium hydroxide solution or an aqueous potassium hydroxide solution, to prepare an aqueous solution of an alkali metal salt of the fatty acid. Next, the aqueous solution of an alkali metal salt of the fatty acid is added to a slurry of the calcium carbonate and water and the mixture is stirred. In this manner, the surface of the calcium carbonate can be surface-treated with the fatty acid.

The solid content of calcium carbonate in the slurry of the calcium carbonate and water can be appropriately controlled in consideration of the average particle diameter of the calcium carbonate, the dispersibility of the calcium carbonate into the slurry, the degree of ease of slurry dehydration, and so on. Generally, a slurry having an appropriate viscosity can be provided by controlling the solid content of the slurry to about 2 to 30% by mass and preferably about 5 to 20% by mass.

The dehydration of the slurry may be performed, for example, by filter pressing. The drying of the slurry may be performed, for example, in a box dryer.

Alternatively, instead of using a fatty acid in the form of a metal salt of the fatty acid, the fatty acid itself may be used to surface treat the surface of the calcium carbonate. For example, the surface of the calcium carbonate can be treated with a fatty acid by stirring the calcium carbonate while heating it at a temperature not lower than the melting point of the fatty acid and adding the fatty acid to the calcium carbonate with stirring. Likewise, the surface of the calcium carbonate may be treated with an ester of a fatty acid by stirring the calcium carbonate while heating it at a temperature not lower than the melting point of the ester of the fatty acid and adding the ester of the fatty acid to the calcium carbonate.

(Silica)

No particular limitation is placed on the method for treating the calcium carbonate with silica, but the treatment with silica can be performed, for example, by depositing silica on the surface of the calcium carbonate to form a silica layer according to the following methods.

An aqueous solution of sodium silicate (liquid glass) is added into a slurry of the calcium carbonate and the mixture is then neutralized with an acidic substance, such as an inorganic acid or an organic acid, to deposit silica on the surface of the calcium carbonate. Thereafter, the slurry of the silica-treated calcium carbonate is dehydrated and dried, so that silica-treated calcium carbonate powder can be obtained.

Alternatively, there is also a method of adding a metal alkoxide solution to the calcium carbonate, then hydrolyzing the metal alkoxide solution to precipitate the metal alkoxide and deposit the metal alkoxide on the surface of the calcium carbonate, thus forming a silica layer.

(Coupling Agent)

Examples of the coupling agent include silane-based coupling agents, titanate-based coupling agents, and aluminate-based coupling agents. Examples of silane-based coupling agents include those cited as examples in relation to the organosilicon compound to be described hereinafter. The above silica-treated calcium carbonate may be surface-treated with these coupling agents.

Examples of the above surface treatment method include wet treatment and dry treatment.

(Organosilicon Compound)

Examples of the organosilicon compound include silane coupling agents, silicone oils having a reactive functional group, and silazanes.

Examples of silane coupling agents include silane coupling agents having a functional group, such as an amino group, an epoxy group, a vinyl group or a methacryl group. Alternatively, silane coupling agents having no functional group may be used.

Examples of silicone oils having a reactive functional group include modified silicone oils, such as methylhydrogenpolysiloxane, dimethylpolysiloxane, methylhydrogenpolysiloxane copolymer, amino-modified silicone oil, alkyl-modified silicone oil, epoxy-modified silicone oil, fluorine-modified silicone oil, and silanol-modified silicone oil.

An example of silazane is hexamethyldisilazane.

The above silica-treated calcium carbonate may be surface-treated with the organosilicon compound.

Examples of the above surface treatment method include wet treatment and dry treatment.

(Condensed Phosphoric Acid)

The calcium carbonate according to the present invention may be surface-treated with a condensed phosphoric acid. Examples of the above surface treatment method include wet treatment and dry treatment. Condensed phosphoric acids that can be used are pyrophosphoric acid, metaphosphoric acid, and so on.

The wet treatment is a method of adding a condensed phosphoric acid to a water suspension liquid of the calcium carbonate, mixing them, then filtering the calcium carbonate, and drying the calcium carbonate. In this method, a sodium salt, a potassium salt or other alkali metal salts of the condensed phosphoric acid may be used. However, from the viewpoint of reducing the content of alkali metal, such as sodium or calcium, to be contained in the surface-treated calcium carbonate, it is preferred that the condensed phosphoric acid be used, not in salt form, but in acid form.

The dry treatment is a method of adding a condensed phosphoric acid to powder of the calcium carbonate, mixing them, and then drying them. The condensed phosphoric acid may be added in liquid form.

The above silica-treated calcium carbonate may be surface-treated with the condensed phosphoric acid.

<Production Method>

The above calcium carbonate according the present invention can be produced by a method including the steps of: preparing a water dispersion of calcium hydroxide to which magnesium hydroxide is added; and introducing carbon dioxide gas into the water dispersion to produce a calcium carbonate.

The amount of magnesium hydroxide added is appropriately controlled so that the magnesium content of the resultant calcium carbonate falls within the range defined in the present invention. The amount of magnesium hydroxide added is, in terms of metallic elements of magnesium relative to the amount of calcium hydroxide, preferably 15000 to 160000 ppm (mg/kg). When the amount of magnesium hydroxide added is in this range, crystal growth of calcium carbonate in a heating process after a carbonation reaction can be suppressed, so that a fine calcium carbonate can be provided. Thus, a calcium carbonate having a BET specific surface area and a crystallite size of (104) plane in the respective ranges defined in the present invention can be produced.

The amount of magnesium hydroxide added is more preferably in a range of 20000 to 140000 ppm and still more preferably in a range of 25000 to 130000 ppm.

Magnesium hydroxide is preferably added in the form of an aqueous solution or a water dispersion. The concentration of the aqueous solution or water dispersion of magnesium hydroxide is preferably in a range of 1 to 30% by mass.

The concentration of the water dispersion of calcium hydroxide to which magnesium hydroxide is to be added is preferably in a range of 0.5 to 15% by mass.

The calcium carbonate is produced by introducing carbon dioxide gas into the water dispersion of calcium hydroxide to which magnesium hydroxide is added, thus carbonating calcium hydroxide. The temperature of the water dispersion of calcium hydroxide during introduction of carbon dioxide gas is preferably in a range of 5 to 30° C.

Because particles of the calcium carbonate just after the carbonation strongly agglomerate, a heating process for breaking the agglomerates of calcium carbonate is generally performed after the carbonation reaction. The calcium carbonate is preferably subjected in the form of a water dispersion to the heating process and the heating process is preferably performed in a range of 50 to 150° C.

In producing a powdered calcium carbonate, the water dispersion of calcium carbonate after the heating process is dehydrated by filter pressing or other processes and then dried, thus producing the powdered calcium carbonate.

In surface-treating the calcium carbonate, the calcium carbonate is surface-treated in the form of a water dispersion or powder according to the treatment method.

<Polymer Composition>

In a polymer composition according to the present invention, the above calcium carbonate according to the present invention is incorporated into a polymer. Examples of the polymer include rubbers, the thermoplastic resins, and the thermosetting resins.

The content of the calcium carbonate is preferably in a range of 1 to 60% by mass, more preferably in a range of 5 to 50% by mass, and still more preferably in a range of 10 to 40% by mass. In incorporating the calcium carbonate into a polymer, the calcium carbonate can be incorporated by a known method depending on the type and other characteristics of the polymer.

EXAMPLES

Hereinafter, the present invention will be described with reference to specific examples, but the present invention is not limited to the following examples.

Examples 1 to 6 and Comparative Examples 1 and 2

A water dispersion of magnesium hydroxide at a concentration of 10% by mass was added to a water dispersion of calcium hydroxide at a concentration of 5% by mass to give each amount of magnesium added shown in Table 1. Note that the amount (ppm) of magnesium added is the amount (mg) of magnesium in terms of metallic elements relative to the amount (kg) of calcium hydroxide.

Carbon dioxide gas was introduced into the water dispersion of calcium hydroxide to which magnesium hydroxide was added, thus carbonating calcium hydroxide. Specific conditions were as follows: The reaction onset temperature of the water dispersion of calcium hydroxide was 15° C. and carbon dioxide gas having a concentration of 30% by volume was introduced by controlling the amount thereof introduced so that the carbonation reaction was over in an hour. A sample was taken from the water dispersion of calcium carbonate just after the end of carbonation, water in the sample was replaced with ethanol, and the sample was then dried to obtain a calcium carbonate just after carbonation. The calcium carbonate just after carbonation was measured in terms of BET specific surface area. The results are shown in Table 1. The BET specific surface area was measured with a fully automatic specific surface area measurement device.

The water dispersion of calcium carbonate after the end of carbonation was subjected to a heating process by holding it at 95° C. for six hours. After the heating process, the water dispersion was dehydrated and dried to obtain a calcium carbonate. The calcium carbonate after the heating process was measured in terms of crystallite size of (104) plane, BET specific surface area, and magnesium content. The results are shown in Table 1.

(Crystallite Size)

The crystallite size of (104) plane was determined from an X-ray diffraction pattern of each obtained calcium carbonate in the manner previously described.

(BET Specific Surface Area)

The BET specific surface area was measured with a fully automatic specific surface area measurement device.

(Magnesium Content)

Each obtained calcium carbonate was measured in terms of magnesium content with an ICP emission spectrometer. The magnesium content (ppm) is the amount (mg) of magnesium in term of metallic elements relative to the amount (kg) of the calcium carbonate.

TABLE 1

| | | | Comp. Ex. 1 | Ex. 1 | Ex. 2 | Ex. 3 | Ex. 4 | Ex. 5 | Ex. 6 | Comp. Ex. 2 |
|---|---|---|---|---|---|---|---|---|---|---|
| Addition to Calcium Hydroxide Slurry (Magnesium Hydroxide) | Amount of Magnesium Added | ppm | 10000 | 20000 | 30000 | 40000 | 60000 | 120000 | 150000 | 200000 |
| Calcium Carbonate Just After Carbonation | BET Specific Surface Area | $m^2/g$ | 67.6 | 68.2 | 70.4 | 70.4 | 74.4 | 58.2 | 55.5 | 50.1 |
| Calcium Carbonate After Heating Process | Crystallite Size | nm | 58.9 | 26.1 | 25.0 | 24.7 | 26.0 | 25.5 | 23.8 | 25.5 |
| | BET Specific Surface Area | $m^2/g$ | 19.1 | 52.9 | 63.6 | 76.6 | 82.1 | 89.3 | 83.6 | 68.3 |
| | Magnesium Content | ppm | 7200 | 14500 | 22000 | 29200 | 44100 | 88200 | 110000 | 160000 |

As shown in Table 1, the calcium carbonates of Examples 1 to 6 having a magnesium content of 12000 to 120000 ppm according to the present invention exhibited large BET specific surface areas just after carbonation and also exhibited large BET specific surface areas after the heating process. Therefore, it can be seen that crystal growth of calcium carbonate in the heating process after the carbonation reaction was suppressed.

Unlike the above, in Comparative Example 1 in which the magnesium content was smaller than the range defined in the present invention, the BET specific surface area just after carbonation was large, but the BET specific surface area after the heating process was small. This can be attributed to the fact that calcium carbonate crystals grew in the heating process after the carbonation reaction.

Furthermore, in Comparative Example 2 in which the magnesium content was larger than the range defined in the present invention, the BET specific surface area after the heating process was also small. In addition, its X-ray diffraction pattern was found to have a peak considered to be attributable to a magnesium compound. This can be attributed to the fact that the magnesium compound melted in the heating process and precipitated.

Comparative Example 3

A calcium carbonate was produced according to an example described in Patent Literature 1. Specifically, carbon dioxide gas having a concentration of 30% was blown at a rate of 150 liters per minute into 30 liters of water dispersion of calcium hydroxide having a concentration of 7% by mass and a liquid temperature of 20° C. to carbonate calcium hydroxide for 25 minutes, an aqueous solution of 150 g of magnesium sulfate ($MgSO_4.7H_2O$) dissolved in 3 liters of water was added to the water dispersion, and then carbon dioxide gas was further added to the water dispersion to carbonate calcium hydroxide. The water dispersion of calcium carbonate after the end of carbonation was subjected to a heating process (aging process) by holding it at 95° C. for six hours. After the heating process, the water dispersion was dehydrated and dried to obtain a calcium carbonate. The calcium carbonate after the heating process was measured in terms of crystallite size of (104) plane, BET specific surface area, and magnesium content. The results are shown in Table 2. The amount of magnesium sulfate added was 7050 ppm in terms of metallic elements of magnesium relative to the amount of calcium hydroxide.

Comparative Example 4

A calcium carbonate was produced in the same manner as in Comparative Example 3 except that an aqueous solution of magnesium sulfate was added so that the amount of magnesium sulfate added in terms of metallic elements reached 60000 ppm. The obtained calcium carbonate was measured in terms of crystallite size of (104) plane, BET specific surface area, and magnesium content. The results are shown in Table 2.

(Electron Microscope Observation)

Figure 1:
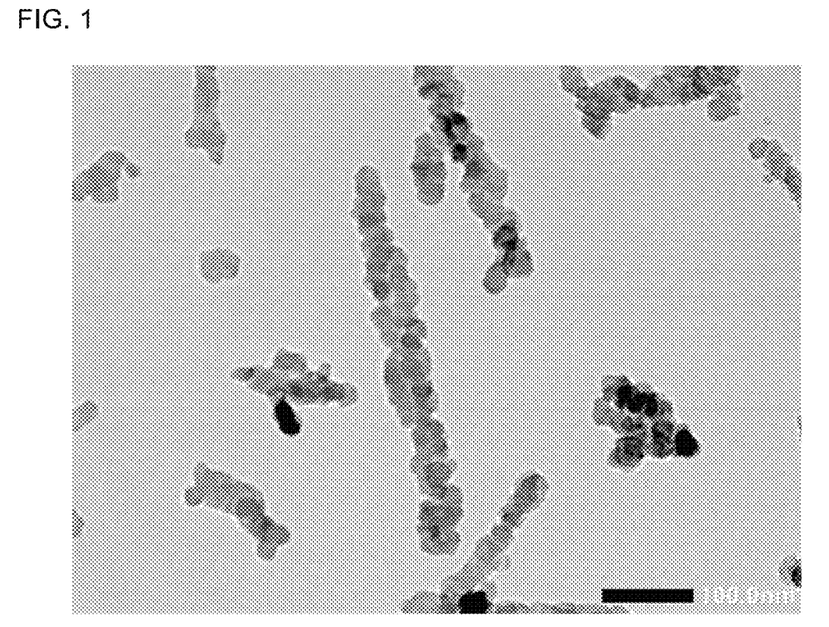
FIG. 1 is a transmission electron micrograph (at 80000-fold magnification) showing a calcium carbonate of Example 4.
Figure 2:
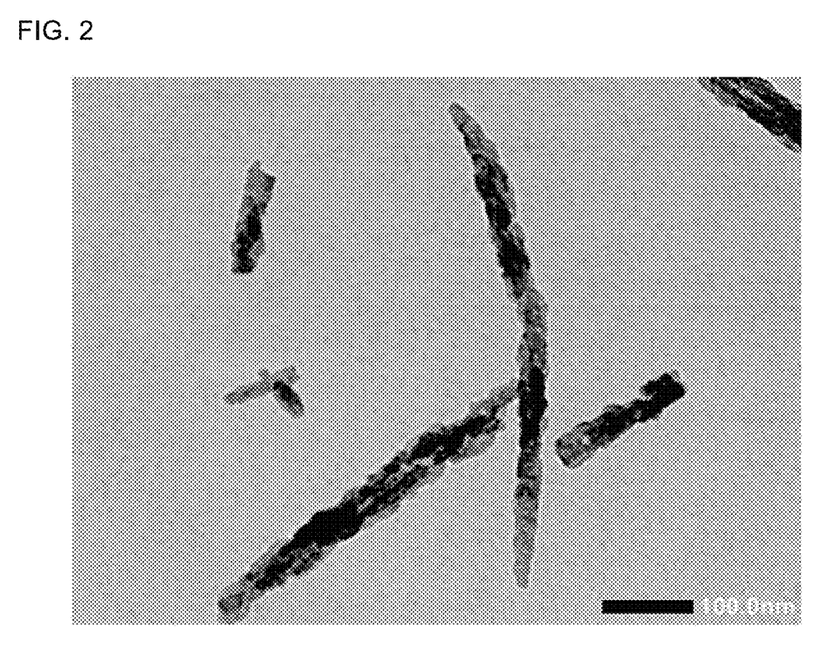
FIG. 2 is a transmission electronmicrograph (at 80000-fold magnification) showing a calcium carbonate of Comparative Example 4.

FIG. 1 is a transmission electron micrograph (at 80000-fold magnification) showing the calcium carbonate of Example 4 and FIG. 2 is a transmission electron micrograph (at 80000-fold magnification) showing the calcium carbonate of Comparative Example 4.

As shown in FIG. 1, it can be seen that in the calcium carbonate of Example 4 fine particles of calcium carbonate are concatenated. Also in the calcium carbonates of the other examples, their particles have been confirmed to be concatenated. The particles of the calcium carbonate of Comparative Example 4 are also concatenated, but the size of particles observed in the electron micrograph is small as compared to that in Example 4. As shown in Table 2, the crystallite size of (104) plane of the calcium carbonate of Comparative Example 4 is smaller than the crystallite size of (104) plane of the calcium carbonate of Example 4. Therefore, the size of particles observed in the electron micrograph can be considered to be associated with the crystallite size of (104) plane. However, because the BET specific surface area in Comparative Example 4 is smaller than the BET specific surface area in Example 4, the particles of the calcium carbonate of Comparative Example 4 can be considered to form agglomerates in which particles strongly agglomerate together.

(X-Ray Diffraction Pattern)

Figure 3:
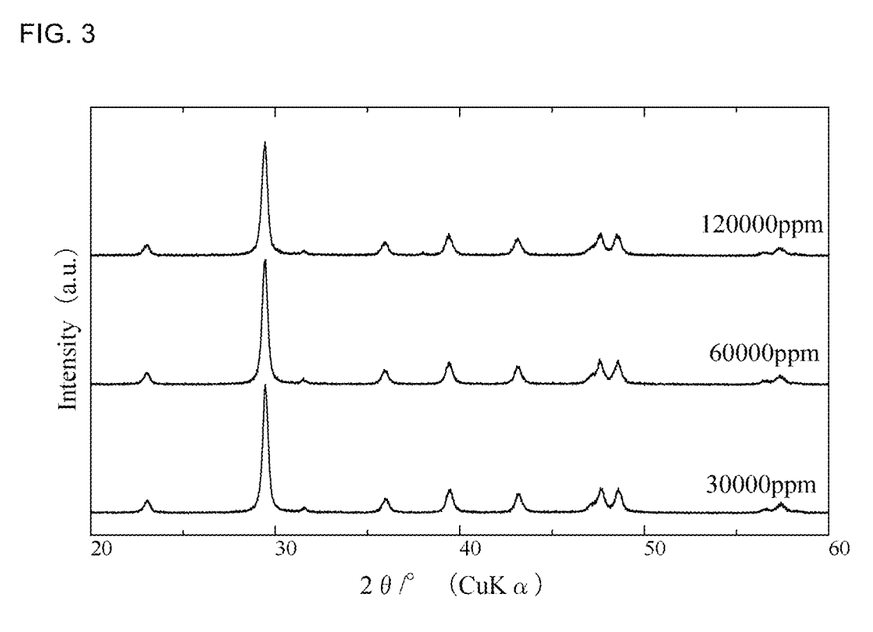
FIG. 3 is a graph showing respective X-ray diffraction patterns of calcium carbonates of Examples 2, 4, and 5.

FIG. 3 is a graph showing respective X-ray diffraction patterns of the calcium carbonates of Examples 2, 4, and 5. In FIG. 3, "30000 ppm" represents Example 2, "60000 ppm" represents Example 4, and "120000 ppm" represents Example 5.

As shown in FIG. 3, the X-ray diffraction patterns of the calcium carbonates of Examples 2, 4, and 5 are free of peak attributable to any magnesium compound, such as magnesium hydroxide, basic magnesium carbonate or normal magnesium carbonate. The calcium carbonates of the other examples have also been confirmed to show no peak attributable to any magnesium compound.

HAKUENKA AA is a calcium carbonate containing a magnesium compound, but has been found to have a peak attributable to the magnesium compound around 21°.

Although the details of in what form magnesium is contained in the calcium carbonate according to the present invention are not clear, it can be considered that magnesium is contained, in the calcium carbonate, in such a form that crystal growth of calcium carbonate in the heating process after the carbonation reaction can be suppressed and the

TABLE 2

| | | | Comp. Ex. 3 | Comp. Ex. 4 |
|---|---|---|---|---|
| Addition to Calcium Hydroxide Slurry (Magnesium Sulfate) | Amount of Magnesium Added | ppm | 7050 | 60000 |
| Calcium Carbonate Just After Carbonation | BET Specific Surface Area | $m^2/g$ | 50.5 | 56.4 |
| Calcium Carbonate After Heating Process | Crystallite Size | nm | 29.0 | 18.0 |
| | BET Specific Surface Area | $m^2/g$ | 52.5 | 67.2 |
| | Magnesium Content | ppm | 5500 | 44000 | calcium carbonate do not form agglomerates in which particles strongly agglomerate.

(Production of Surface-Treated Calcium Carbonate)

Each of the calcium carbonates of Examples 1 to 5 and Comparative Examples 3 and 4 was surface-treated in the following manner to produce a surface-treated calcium carbonate.

Water was added to each calcium carbonate so that the solid content of calcium carbonate reached 10% by mass, and the calcium carbonate was then stirred at 40° C. to prepare a slurry of calcium carbonate. Next, a sodium salt of stearic acid (ST-NA manufactured by NOF Corporation) adjusted to 10% by mass was mixed into the slurry to reach Paraffin oil (PW-380 manufactured by Idemitsu Kosan Co., Ltd.): 10 parts by mass, Vulcanization promoter ZnBDc: 1 part by mass, Vulcanization promoter CBS: 1.5 parts by mass, Vulcanization promoter TMTD: 0.5 parts by mass, Sulfur: 1.5 parts by mass, and Surface-treated calcium carbonate: 100 parts by mass.

The obtained rubber compositions were measured in terms of 100% modulus, 300% modulus, 500% modulus, tensile strength, and elongation in conformity with JIS K 6251. No. 3 dumbbell specimens were used. The tension rate was 500 mm/min. A type A durometer was used for hardness measurement. The evaluation results are shown in Table 3.

TABLE 3

| Surface-Treated Calcium Carbonate | | | Ex. 7 | Ex. 8 | Ex. 9 | Ex. 10 | Ex. 11 | Comp. Ex. 5 | Comp. Ex. 6 | HAKUENKA O |
|---|---|---|---|---|---|---|---|---|---|---|
| Calcium Carbonate as Base | Amount of Magnesium Added (Magnesium Compound) | ppm | Ex. 1 20000 (Magnesium Hydroxide) | Ex. 2 30000 (Magnesium Hydroxide) | Ex. 3 40000 (Magnesium Hydroxide) | Ex. 4 60000 (Magnesium Hydroxide) | Ex. 5 120000 (Magnesium Hydroxide) | Comp. Ex. 3 7050 (Magnesium Sulfate) | Comp. Ex. 4 60000 (Magnesium Sulfate) | — — |
| | Amount of Magnesium Added | ppm | 14500 | 22000 | 29200 | 44100 | 88200 | 5500 | 44000 | — |
| 100% Modulus | [MPa] | | 2 | 2.1 | 2.2 | 2.2 | 2.3 | 2.3 | 2.2 | 2.3 |
| 300% Modulus | [MPa] | | 3.8 | 4 | 4.1 | 4.2 | 4.4 | 3.4 | 3.2 | 3.5 |
| 500% Modulus | [MPa] | | 8 | 8.4 | 8.4 | 8.5 | 8.8 | 6.9 | 7.0 | 7.8 |
| Tensile Strength | [MPa] | | 16.5 | 17 | 17.1 | 17.5 | 17.2 | 13.5 | 13.1 | 14.2 |
| Elongation | [%] | | 660 | 660 | 670 | 670 | 660 | 600 | 600 | 610 |
| Hardness | | | 74 | 74 | 75 | 76 | 76 | 72 | 71 | 74 |

3 parts by mass relative to 100 parts by mass of calcium carbonate and thus surface-treat the calcium carbonate. Thus, a slurry of surface-treated calcium carbonate was prepared. Next, the obtained slurry was dehydrated and the obtained cake was dried in a box dryer.

Examples 7 to 11 were assigned to the respective surface-treated calcium carbonates obtained using the calcium carbonates of Examples 1 to 5, Comparative Example 5 was assigned to the surface-treated calcium carbonate obtained using the calcium carbonate of Comparative Example 3, and Comparative Example 6 was assigned to the surface-treated calcium carbonate obtained using the calcium carbonate of Comparative Example 4.

(Evaluations as Polymer Composition)

Evaluations as polymer compositions were made with the use of EPDM rubber as a polymer. Specifically, rubber compositions were prepared in the following formulation and then evaluated. As surface-treated calcium carbonates, the surface-treated calcium carbonates of Examples 7 to 11 and Comparative Examples 5 and 6 and HAKUENKA O, which is a commercialized product, were used.

EPDM rubber (EP-21 manufactured by JSR Corporation): 100 parts by mass,

Zinc oxide: 5 parts by mass,

Stearic acid: 1 part by mass,

As shown in Table 3, it can be seen that, with the use of the surface-treated calcium carbonates of Examples 7 to 11 according to the present invention, higher moduli and tensile strengths than in Comparative Examples 5 and 6 and KAKUENKA O could be obtained. In addition, the elongations and hardnesses were also high. Particularly, the increases in elongation show that the dispersed state of calcium carbonate in a polymer was good.

The invention claimed is:

1. A calcium carbonate having a magnesium content of 12000 to 120000 ppm, a BET specific surface area of 60 to 120 m²/g, and a crystallite size of (104) plane of 20 to 50 nm, particles of the calcium carbonate being concatenated.

2. The calcium carbonate according to claim 1, having an X-ray diffraction pattern free of peak attributable to any magnesium compound.

3. The calcium carbonate according to claim 1, having a calcite crystal structure.

4. The calcium carbonate according to claim 1, wherein the calcium carbonate is surface-treated with at least one treatment agent selected from the group consisting of a fatty acid, a resin acid, derivatives of the fatty acid, derivatives of the resin acid, silica, a coupling agent, an organosilicon compound, and a condensed phosphoric acid.

5. A polymer composition containing the calcium carbonate according to claim 1.

6. A method for producing the calcium carbonate according to claim 1, the method comprising the steps of:

preparing a water dispersion of calcium hydroxide to which magnesium hydroxide is added; and introducing carbon dioxide gas into the water dispersion to produce the calcium carbonate.

7. The method for producing calcium carbonate according to claim 6, wherein an amount of the magnesium hydroxide added relative to an amount of the calcium hydroxide is 15000 to 160000 ppm.

8. A calcium carbonate produced by the method according to claim 6.

\* \* \* \* \*